(12) United States Patent
Guo (10) Patent No.: US 7,116,154 B2
(45) Date of Patent: Oct. 3, 2006

(54) LOW POWER CHARGE PUMP

(75) Inventor: Xin Guo, Mountain View, CA (US)

(73) Assignee: Spansion LLC, Sunnyvale, CA (US)

( * ) Notice: Subject to any disclaimer, the term of this patent is extended or adjusted under 35 U.S.C. 154(b) by 0 days.

(21) Appl. No.: 10/636,337

(22) Filed: Aug. 6, 2003

(65) Prior Publication Data

US 2005/0030087 A1 Feb. 10, 2005

(51) Int. Cl.
*G05F 3/24* (2006.01)

(52) U.S. Cl. .................. 327/536; 327/544; 365/227; 363/60

(58) Field of Classification Search ............ 327/536, 327/537, 544; 363/59, 60; 365/189.09, 365/227

See application file for complete search history.

(56) References Cited

U.S. PATENT DOCUMENTS

| | | | | |
|---|---|---|---|---|
| 3,908,182 | A * | 9/1975 | Lampe et al. ............... | 365/184 |
| 5,764,096 | A * | 6/1998 | Lipp et al. .................. | 327/434 |
| 6,008,690 | A * | 12/1999 | Takeshima et al. ......... | 327/534 |
| 6,154,088 | A * | 11/2000 | Chevallier et al. .......... | 327/536 |
| 6,781,440 | B1 * | 8/2004 | Huang ........................ | 327/537 |
| 6,788,111 | B1 * | 9/2004 | Sun et al. ................... | 327/37 |
| 2002/0014908 | A1 * | 2/2002 | Lauterbach ................. | 327/536 |
| 2002/0101744 | A1 * | 8/2002 | DeMone ..................... | 363/59 |

\* cited by examiner

*Primary Examiner*—Timothy P. Callahan
*Assistant Examiner*—Terry L. Englund (57) ABSTRACT

A low power charge pump is disclosed. A pump driving node of a first pump stage is selectively coupled to a pump driving node of the subsequent pump stage. Subsequent to a transfer of charge from a first pump stage to a subsequent stage, the first and subsequent pump driving nodes are coupled. Residual charge on a first stage pump driving node is thereby transferred to a subsequent pump driving node. Subsequent to the transfer of charge from the first pump driving node to the second pump driving node, the nodes are uncoupled. By selectively coupling a first pump stage to a pump driving node of the subsequent pump stage, the first pump driving node may pre-charge the subsequent pump driving node, thereby reducing the energy that must be provided by clock driving circuitry to produce a positive-going transition of a driving clock. Advantageously, pre-charging energy is taken from the first stage, reducing the energy that was heretofore dissipated by clock driving circuitry during a negative-going clock signal transition. In this novel manner conversion efficiency of a charge pump device may be beneficially increased, providing enhanced low power performance.

8 Claims, 8 Drawing Sheets

Figure 1

(Conventional Art)

LOW POWER CHARGE PUMP

TECHNICAL FIELD

Embodiments of the present invention relate to design and operation of sub-micron metal oxide semiconductors. More particularly, embodiments of the present invention provide a low power charge pump.

BACKGROUND ART

Flash memory is a type of semiconductor computer memory with many desirable characteristics. Like read only memory, ROM, it is non-volatile, meaning that the contents of the memory are stable and retained without applied electrical power.

Flash memory devices have found wide commercial success in the electronic device market. A major advantage of flash over ROM is that the memory contents of flash may be changed after the device is manufactured. Flash memory has found wide acceptance in many types of computers, including desktop computers, mobile phones and hand held computers. Flash memory is also widely used in digital cameras and portable digital music players, for example "MP3" players.

In addition to direct flash storage applications, for example in video cameras, flash-based storage devices are replacing rotating magnetic disks, sometimes known as hard drives, in many applications. Compared to hard drives, flash is significantly more rugged, quieter, lower power, and for some densities such a flash based device may be smaller than a comparable hard drive.

Figure 1:
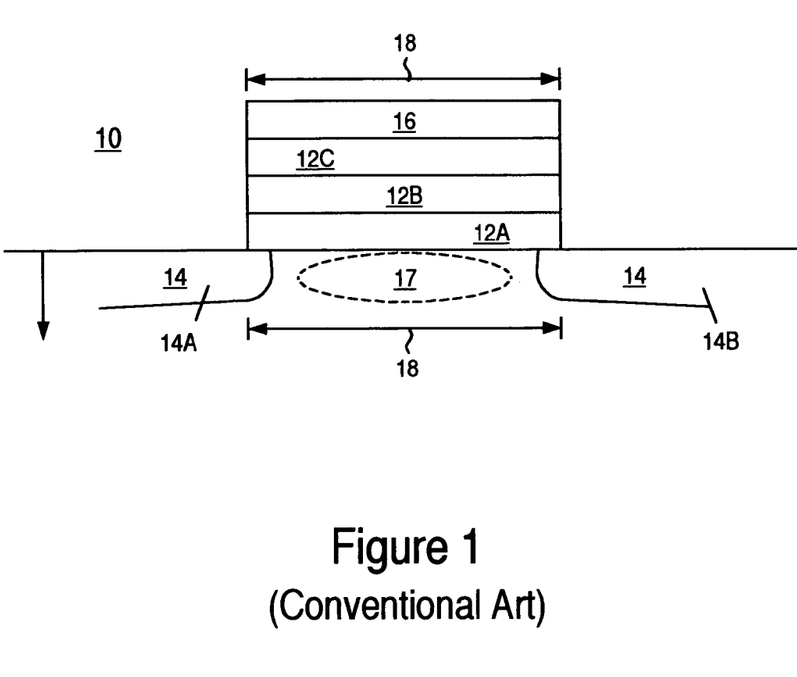
FIG. 1 shows a memory cell as has been well known in the conventional art.

FIG. 1 shows a memory cell 10 as has been well known in the conventional art. Regions 14 are the drain and/or source regions for memory cell 10. They may be used as source and/or drain interchangeably. Control gate 16 is used to control the operation of memory cell 10. A channel region 17 is formed between source/drain regions 14. Feature size 18 is the nominal size of the smallest feature that can be created by a particular semiconductor process. In memory cells of this type, the gate 16 width and channel 17 length typically correspond approximately to feature size 18.

Memory cell 10 may be one of two general types of non-volatile memory, a "floating gate" cell or a nitride read only memory (NROM) cell. In a floating gate cell, layer 12B of the gate stack is typically conductive polysilicon. Layers 12A and 12C are insulating materials which isolate or "float" gate layer 12B, which is usually referred to as a floating gate. Floating gate 12B is the storage element of memory cell 10.

Silicon nitride based flash memory has many advantages as compared to its floating gate and tunneling oxide based counterparts. Silicon-Oxide-Nitride-Oxide-Silicon (SONOS) is potentially very dense in terms of number of cells per unit area that can be used and it requires fewer process steps as compared to floating gate memory. Moreover, it can be easily integrated with standard SRAM process technology. A further advantage of using SONOS devices is their suitability for applications requiring large temperature variations and radiation hardening. The SONOS stack is a gate dielectric stack and consists of a single layer of polysilicon, a triple stack ONO (Oxide-Nitride-Oxide) gate dielectric layer and a MOS channel 17. The ONO structure may consist of a tunnel oxide 12A, a nitride memory storage layer 12B and a blocking oxide layer 12C.

Flash memory devices are typically configured as an array of many instanced of individual cells, e.g., cell 10, oriented in rows and columns. Typically, the control gates, e.g., control gate 16 of FIG. 1, of the cells in each row are connected to a series of word lines, thus forming individual rows of cells that can be accessed by selecting the corresponding word line. Similarly, the source and/or drain, e.g., regions 14, of the cells in each column are connected to a series of bit lines, thus forming individual columns of cells that can be accessed by selecting the corresponding bit lines.

Memory device manufacturers are continually challenged to provide ever greater amounts of memory at ever lower costs. Recently, Advanced Micro Devices, Incorporated of California has introduced MIRROR BIT™ nitride-based flash ROM that stores multiple bits per memory cell 10 physically separated in nitride layer 12B. Such storage of multiple bits per cell increases the storage density of the memory device, thereby reducing the cost per bit of storage.

To read a bit stored in the "left" portion of memory cell 10, a word line is brought to a read voltage of about 4.5 volts and a bit line is grounded. Node 14A (the "left" instance of regions 14) functions as a source for the cell, and current flows from node 14B, acting as a drain, to node 14A through a bit line to ground. Sensing logic connected to the bit line can interpret the magnitude of the current (which is affected by the amount of charge stored in nitride gate layer 12B) in order to determine if a bit is stored in the "left" portion of cell 10.

To read a bit stored in the "right" portion of memory cell 10, a word line is brought to a read voltage of about 4.5 volts and a bit line is grounded. Node 14B (the "right" instance of regions 14) functions as a source for the cell, and current flows from node 14A, acting as a drain, to node 14B through a bit line to ground. Sensing logic connected to the bit line can interpret the magnitude of the current (which is affected by the amount of charge stored in nitride gate layer 12B) in order to determine if a bit is stored in the "right" portion of cell 10.

To write (or program) a bit into the "right" portion of memory cell 10, a line is brought to a programming voltage of about 9.5 volts, and a bit line is grounded and acts as a source. Current is sourced from the word line through node 14A into bit line. The current causes hot carrier injection of charge into the nitride layer of the SONOS stack in physical proximity to node 14A.

To write (or program) a bit into the "left" portion of memory cell 10, a line is brought to a programming voltage of about 9.5 volts, and a bit line is grounded and acts as a source. Current is sourced from the word line through node 14B into bit line. The current causes hot carrier injection of charge into the nitride layer of the SONOS stack in physical proximity to node 14B.

Most low power flash memory devices operate, e.g., read and program, on a single external voltage supply, for example 1.8 volts. Internal voltages, e.g., a bias voltage of 9.5 volts for programming or a bias voltage of 4.5 volts for reading, are typically generated by auxiliary circuits, for example, a charge pump, on a flash memory integrated circuit. There are many advantages realized by product designers (e.g., a designer using flash memory in a product) from a single-supply part such as a flash memory. For example, a product designer only needs to design a single power supply for a product. Efficient product-level power supplies frequently require magnetic devices, e.g., inductors. Inductors frequently are rather "tall" components. Limiting the number of "tall" components beneficially allows for thinner products. As a further benefit, a single-supply device isolates a product designer from the details of device voltage requirements. A device designer is better able to beneficially select operating voltage(s) for optimum performance.

In addition, an integrated circuit implementation of a power conversion circuit may typically be smaller and less expensive than a system-level circuit board implementation. A further advantage of integrating power conversion circuitry into a single-supply integrated circuit is related to "second sourcing" of components. Many manufacturers of high volume electronic assemblies require similar components to be available from at least two (a first and a "second") independent supply chains. In the case of flash memory devices, for example, a single, common external voltage supply may mask very different internal designs of the two different flash devices which otherwise might require multiple different and incompatible voltages in order to support each of the two suppliers of memory devices.

Unfortunately, power conversion circuits implemented on an integrated circuit are typically less efficient at converting energy from one voltage to another than a system-level circuit board implementation of a voltage conversion circuit. Among the factors contributing to lower efficiencies is the general commercial unfeasibility of rendering an inductor of sufficient value for use in a power conversion circuit. Inductive-based circuits are generally more efficient in power conversion than capacitive-based circuits. An additional factor is that capacitive features in an integrated circuit are relatively large, and must be minimized to allow, for example, for a maximum memory array size within the bounds of an integrated circuit.

Figure 2A:
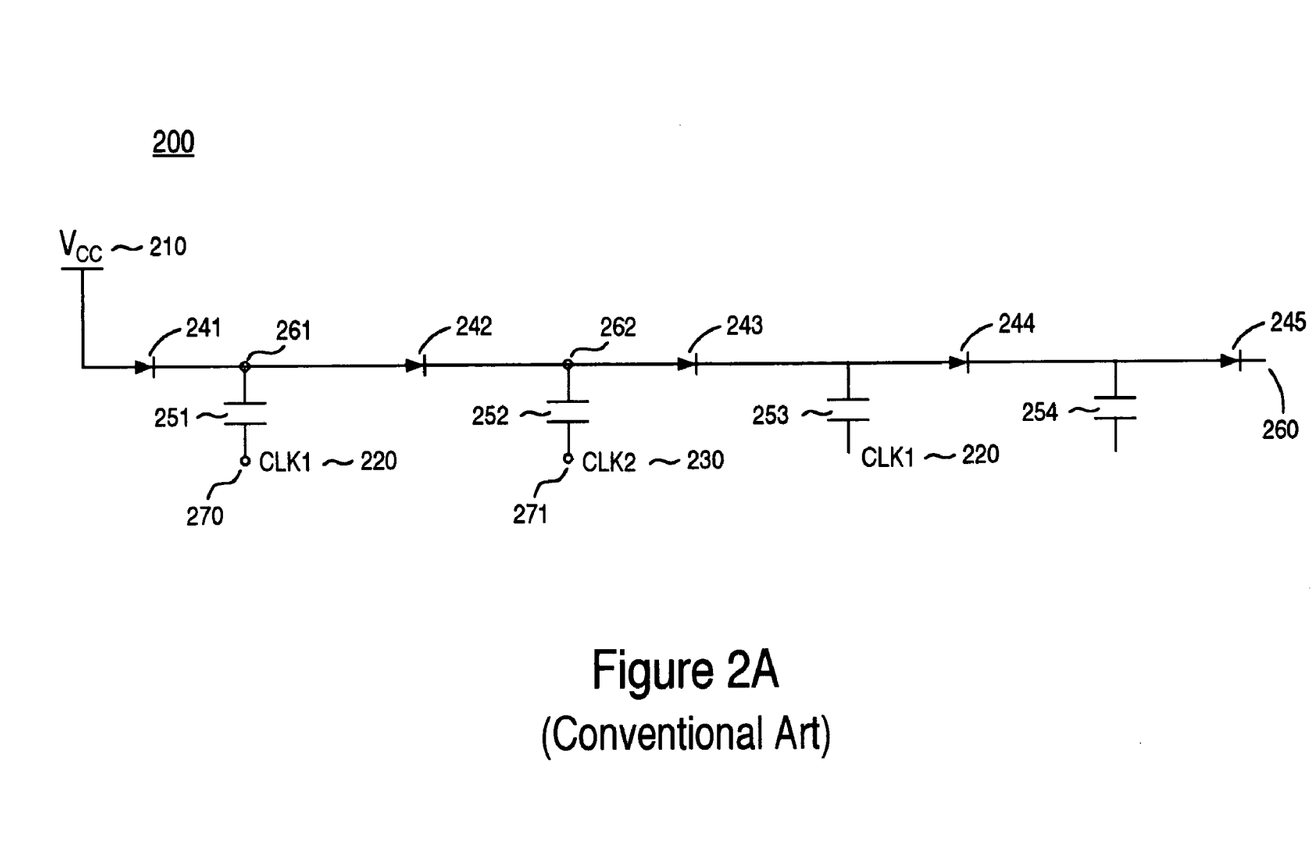
FIG. 2A illustrates a charge pump circuit, as is conventionally employed on an integrated circuit to boost a voltage.

FIG. 2A illustrates a charge pump circuit 200, as is conventionally employed on an integrated circuit to boost a voltage. Charge pump circuit 200 comprises diodes 241 through 245 and capacitive elements 251 through 254. Capacitive elements 251 through 254 are generally known as "pump capacitors." Nodes 261 and 262 are known as "pump nodes." A square wave clock signal, CKL1 220, is applied to or "drives" the bottom leg of capacitive element 251. The bottom leg of a capacitive element is generally known as a "pump driving node," e.g., pump driving nodes 270 and 271. A supply voltage, Vcc 210 is applied at the anode of diode 241, and an output voltage is available at output node 260.

Figure 2B:
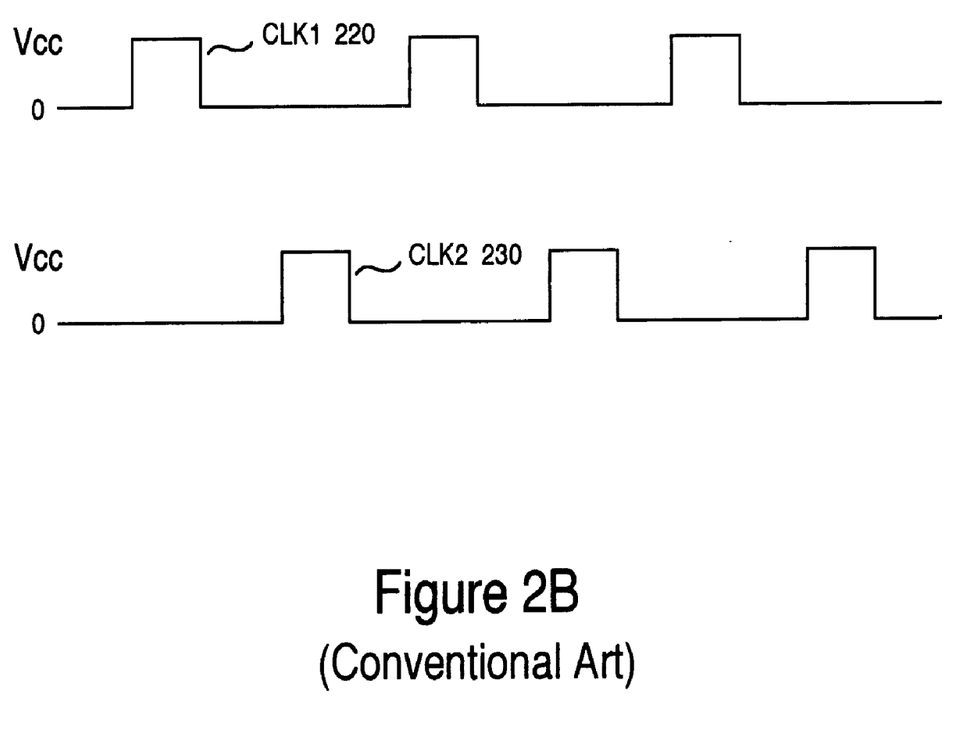
FIG. 2B illustrates clock signals used to drive a charge pump circuit.

FIG. 2B illustrates the CLK1 220 and CLK2 230 signals. They typically range from 0 volts to Vcc 210, with a "high" duty cycle of, e.g., 25%. CLK2 230 has the same waveshape as CLK1 220, but is delayed by 180 degrees. Consequently, when CLK1 220 is high CLK2 230 is low and vice versa. In addition, there may be two periods of time when both signals are low.

Referring once again to FIG. 2A, when CLK1 220 is low, capacitive element 251 charges through diode 241: When capacitive element 251 is fully charged, node 261 will be at approximately Vcc. When capacitive element 251 is fully charged CLK1 220 transitions to a high level of approximately Vcc 210, and node 261 jumps to approximately 2 Vcc 210. Diode 241 is now reversed biased and does not conduct. CLK2 230 transitions to a low level, so diode 242 is forward biased and the voltage of node 261 is transferred to node 262, charging capacitive element 252.

When CLK2 230 subsequently transitions to a high level of approximately Vcc 210, node 262 jumps to approximately 3 Vcc 210. This process may be repeated throughout numerous stages to produce a range of output voltages for use by other circuits within an integrated circuit. Within the conventional art, diodes in a charge pump circuit have frequently been replaced by pass gate devices in order to eliminate a loss of energy due to a diode drop. It is to be appreciated that the use of pass gate devices requires additional clocking logic to open a pass gate when it is desirable to conduct, and to close a pass gate when it is desirable to block current flow.

Because flash memory devices have found widespread acceptance in low power applications, e.g., battery-powered cell phones and hand held computers, increasing the efficiency of internal power conversion circuitry within a flash memory device will beneficially reduce power consumption at the product level, thereby increasing battery life and making the product commercially more attractive. Consequently, improvements in integrated circuit power conversion circuit design are highly desirable and offer a competitive advantage over products containing less efficient designs.

Semiconductor processing equipment is extremely expensive. Fundamental semiconductor processing steps, e.g., implantation and diffusion, typically require long periods of development and extensive qualification testing. Implementing a new fabrication process requires considerable resources on the part of the semiconductor manufacturer. A manufacturer may have to alter or entirely revamp process libraries and process flows in order to implement a new fabrication process. Additionally, re-tooling a fabrication line is very expensive, both in terms of direct expenses as well as in terms of opportunity cost due to the time required to perform the re-tooling. Consequently, any solution to increase the rate of flash programming should be compatible with existing semiconductor processes and equipment without the need for revamping well established tools and techniques.

Accordingly, a need exists to increase the efficient of a charge pump. A further need exists for increasing the efficiency of a charge pump in a manner that is compatible and complimentary with conventional approaches to implementing high efficiency charge pumps. A still further need exists for the above mentioned needs to be achieved with existing semiconductor processes and equipment without revamping well established tools and techniques.

DISCLOSURE OF THE INVENTION

Embodiments of the present invention provide a means to increase the efficiency of charge pumps. Further embodiments of the present invention provide for increasing the efficiency of charge pumps in a manner that is compatible and complimentary with conventional approaches to implementing high efficiency charge pumps. Still further embodiments of the present invention provide for the above mentioned solutions to be achieved with existing semiconductor processes and equipment without revamping well established tools and techniques.

A low power charge pump is disclosed. A pump driving node of a first pump stage is selectively coupled to a pump driving node of the subsequent pump stage. Subsequent to a transfer of charge from a first pump stage to a subsequent stage, the first and subsequent pump driving nodes are coupled. Residual charge on a first stage pump driving node is thereby transferred to a subsequent pump driving node. Subsequent to the transfer of charge from the first pump driving node to the second pump driving node, the nodes are uncoupled. By selectively coupling a first pump stage to a pump driving node of the subsequent pump stage, the first pump driving node may pre-charge the subsequent pump driving node, thereby reducing the energy that must be provided by clock driving circuitry to produce a positive-going transition of a driving clock. Advantageously, pre-charging energy is taken from the first stage, reducing the energy that was heretofore dissipated by clock driving circuitry during a negative-going clock signal transition.

An additional embodiment of the present invention provides novel pump driving node clock signals comprising a high impedance state to drive pump driving nodes in conjunction with selective coupling of the pump driving nodes.

Another embodiment of the present invention provides for driving threshold voltage cancellation pass gate devices at supply voltages of less than about 1.8 volts.

BEST MODE FOR CARRYING OUT THE INVENTION

In the following detailed description of the present invention, low power charge pump, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail so as not to unnecessarily obscure aspects of the present invention.

Low Power Charge Pump

Embodiments of the present invention are described in the context of design and operation of flash memory devices. However, it is appreciated that embodiments of the present invention may be utilized in other areas of electronic design and operation.

Referring once again to FIGS. 2A and 2B, a negative clock transition at the bottom terminal of the capacitive elements, e.g., at pump driving node 270, is a functional element of charge pump circuit 200. Unfortunately, that clock transition "steals" some charge from the capacitive element, dissipating that energy in the clock driver circuitry, decreasing the efficiency of energy conversion within charge pump circuit 200. Correspondingly, a positive clock transition has to supply energy to the base of a capacitive element, drawing power from the clock driver circuitry.

Figure 3:
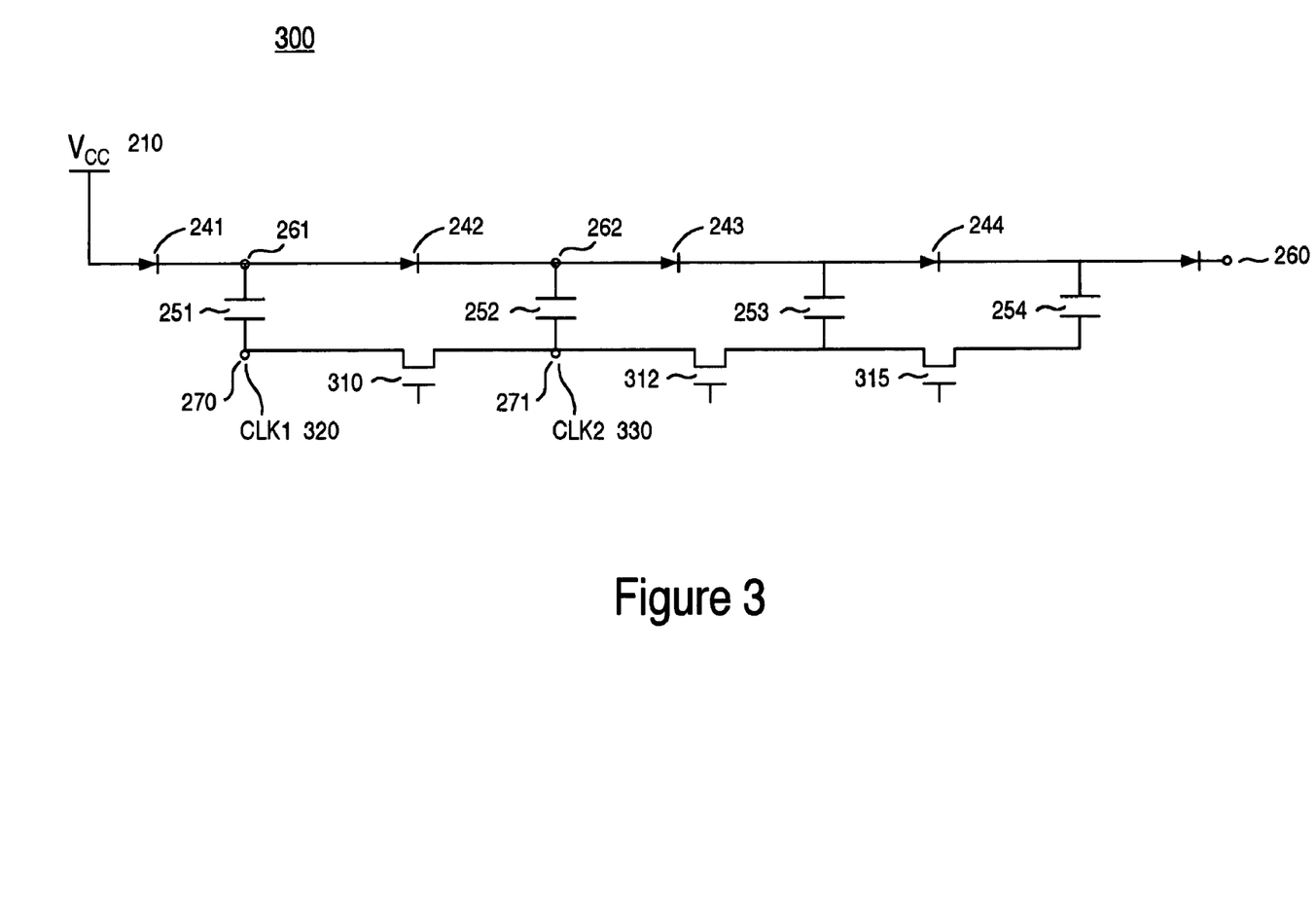
FIG. 3 illustrates a low power charge pump circuit, according to an embodiment of the present invention.

FIG. 3 illustrates a low power charge pump circuit 300, according to an embodiment of the present invention. In addition to the elements described for charge pump circuit 200, low power charge pump circuit 300 comprises pass gates 310, 312 and 315. Pass gates 310, 312 and 315 serve to pre-charge a pump driving node, and are herein referred to as pump driving node pre-charge pass gates.

According to an embodiment of the present invention, pump driving node pre-charge pass gates may be operated beneficially to pre-charge a pump driving node, thereby reducing the energy that must be provided by clock driving circuitry to produce a positive-going transition of a driving clock. Advantageously, the pre-charging energy is taken from a prior stage, reducing the energy that was heretofore dissipated by clock driving circuitry during a negative-going clock signal transition.

Figure 4:
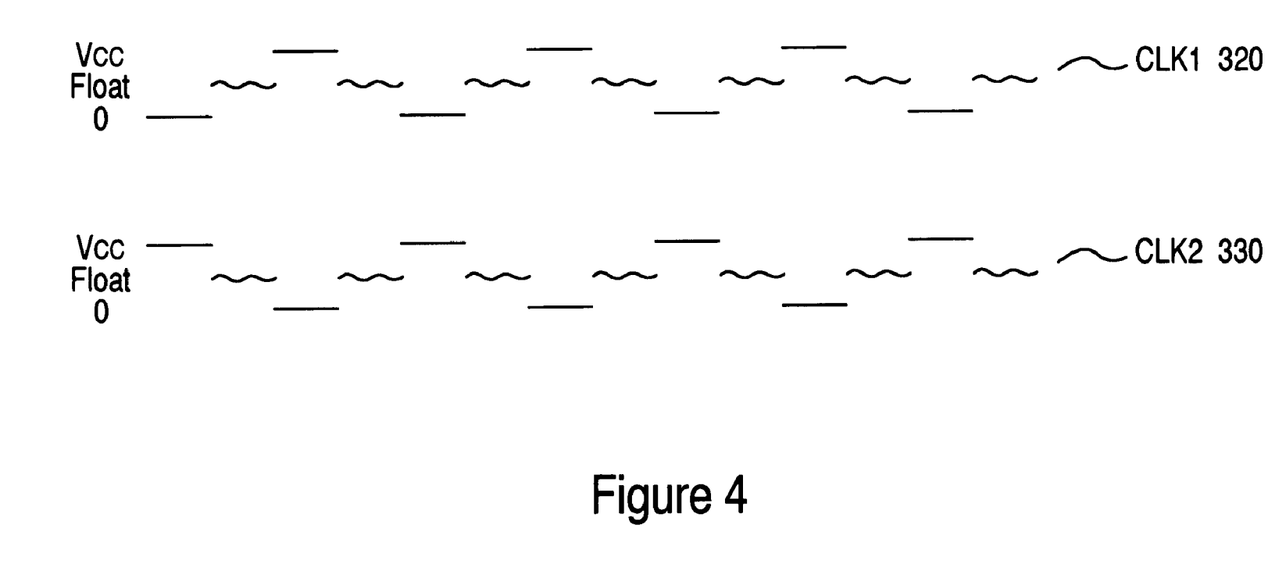
FIG. 4 illustrates clock signals used to drive a low power charge pump circuit, according to an embodiment of the present invention.

FIG. 4 illustrates clock signals used to drive low power charge pump circuit 300, according to an embodiment of the present invention. CLK1 320 and CLK2 330 are similar to CLK1 220 and CLK2 230. CLK1 320 and CLK2 330 have the same period and duty cycle, and are 180 degrees out of phase. CLK1 320 and CLK2 330 are driven by drivers capable of a high impedance state. When CLK1 320 and CLK2 330 are neither high nor low, the drivers enter a high impedance state and the nodes, e.g., pump driving node 270 and 271 float. At this time, a pump driving node pre-charge pass gate may conduct to transfer charge from one pump driving node, e.g., pump driving node 270, to a pump driving node, e.g., pump driving node 271, in a subsequent stage.

Referring once again to FIG. 3, an exemplary cycle of the operation of low power charge pump circuit 300 will now be described. When CLK1 320 is driven low, capacitive element 251 charges through diode 241. When capacitive element 251 is fully charged, node 261 will be at approximately Vcc. When capacitive element 251 is fully charged, CLK1 320 goes into a high impedance state.

CLK1 320 transitions to a high level of approximately Vcc 210, pump driving node pre-charge pass gate 310 closes and node 261 jumps to approximately 2 Vcc 210. Diode 241 is now reversed biased and does not conduct. CLK2 330 transitions to a low level, so diode 242 is forward biased and the voltage of node 261 is transferred to node 262, charging capacitive element 252.

CLK2 330 goes into a high impedance state. Pump driving node pre-charge pass gate 310 closes and charge flows between pump driving node 270 and pump driving node 271, providing a voltage at pump driving node 271 of approximately one half of Vcc. Pump driving node pre-charge pass gate 310 then opens, isolating pump driving nodes 270 and 271. When CLK2 330 transitions to a high level of approximately Vcc 210, the CLK2 330 driving circuitry only has to supply the charge equivalent to one half of Vcc as pump driving node 271 has been pre-charged to one half of Vcc. As a beneficial result, energy that would have been dissipated through a negative-going clock transition is transferred to a subsequent stage and reused in association with a positive-going clock transition, thereby increasing the efficiency of the power conversion circuit.

Figure 5:
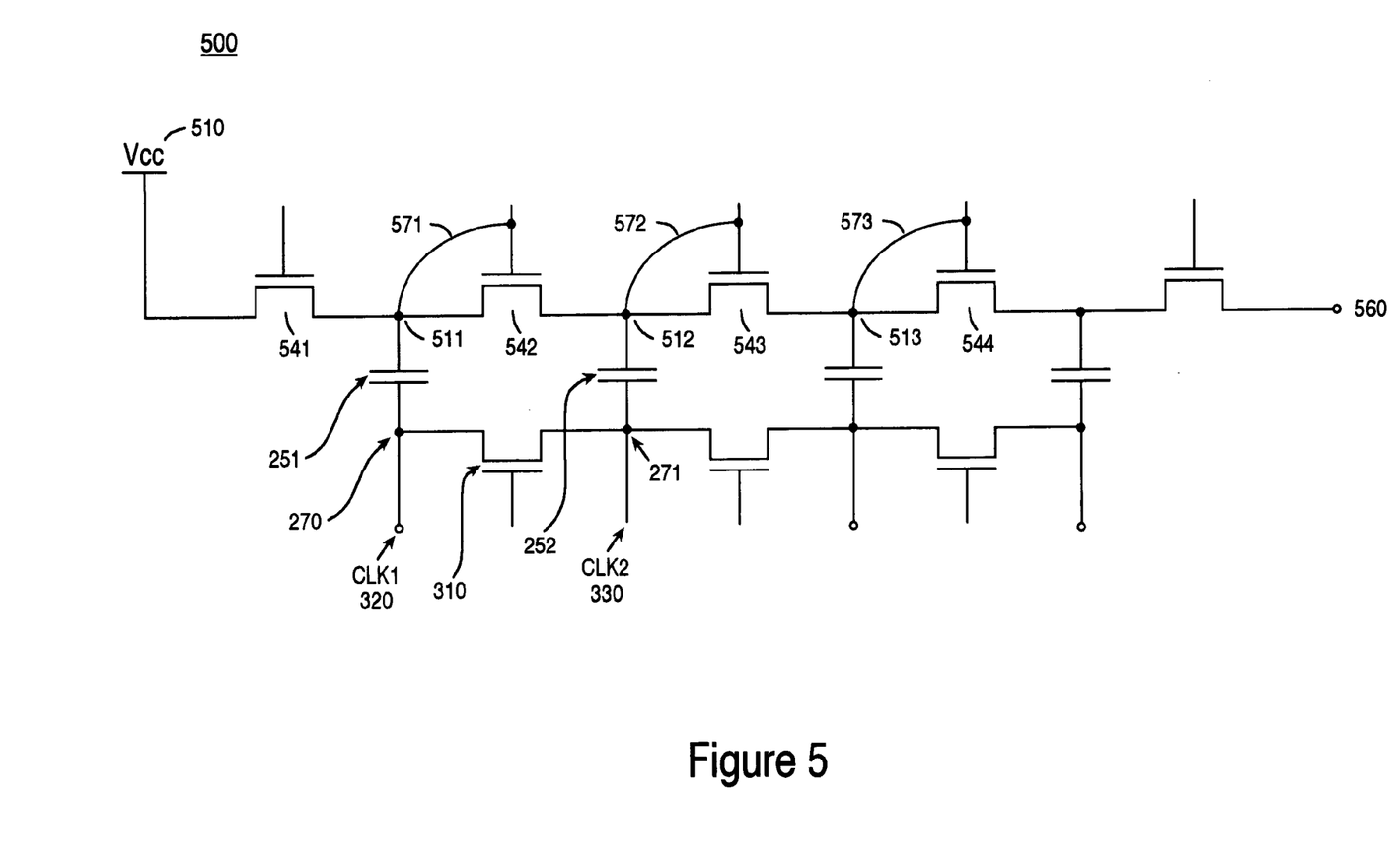
FIG. 5 illustrates a charge pump circuit, according to an embodiment of the present invention.

As mentioned above, pass gate devices may be used in place of diodes, for example diodes 241–244, in a charge pump circuit. FIG. 5 illustrates a charge pump circuit 500 which is similar to charge pump circuit 300, according to an embodiment of the present invention. Pass gate devices 541, 542, 543, and 544 have replaced diodes 241, 242, 243, and 244 of charge pump circuit 300. Pass gate devices 541–544 may serve to reduce energy loss present in charge pump circuit 300 due to diode drop. Pass gate devices 541–544 are referred to as threshold voltage ($V_T$) cancellation pass gates.

Coupling 571 couples the control terminal of pass gate device 542 with pump node 511. Coupling 572 couples the control terminal of pass gate device 543 with pump node 512. Coupling 573 couples the control terminal of pass gate device 544 with pump node 513.

Figure 6:
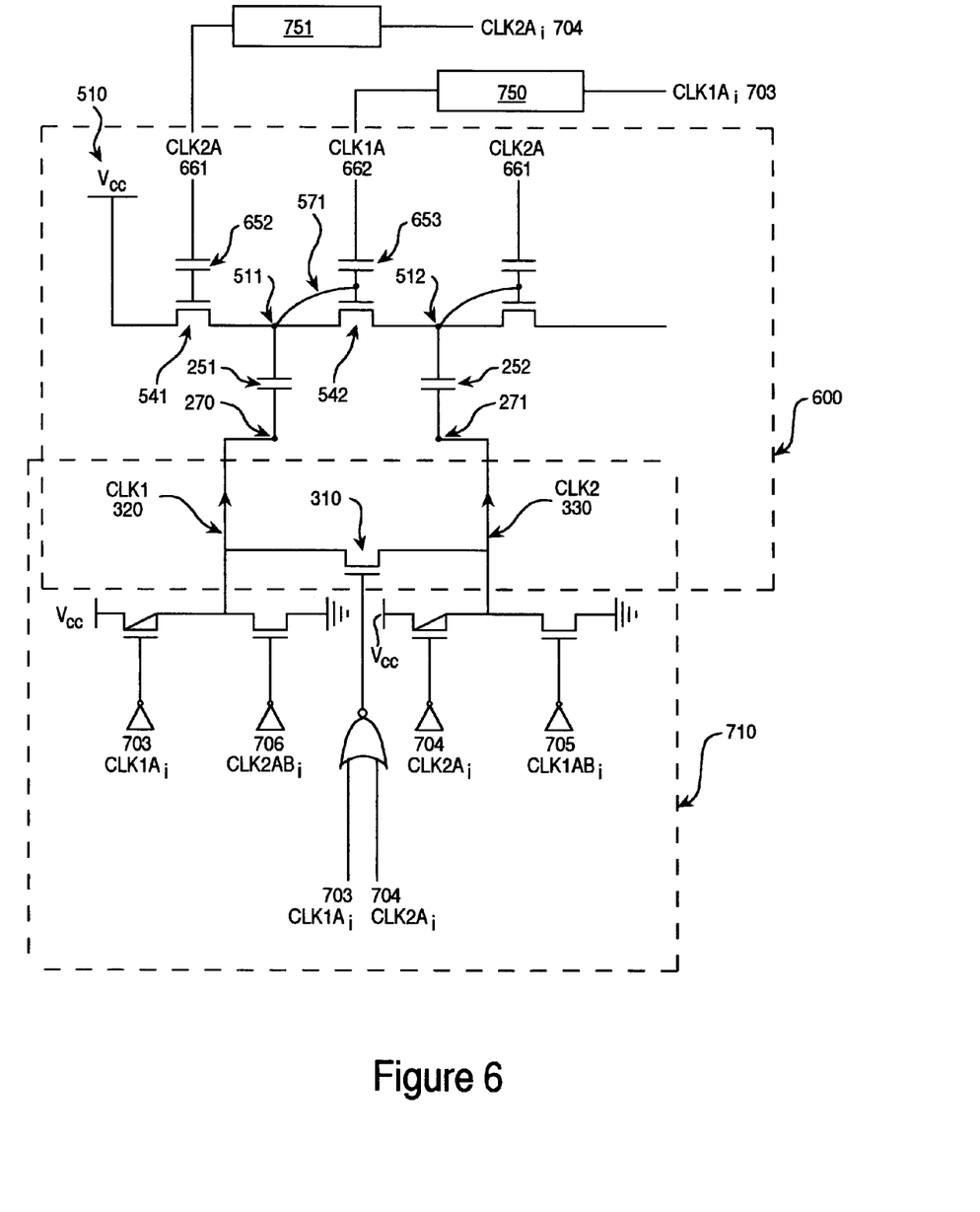
FIG. 6 illustrate a charge pump circuit for operation at low supply voltages, according to an embodiment of the present invention.

FIG. 6 also illustrates the relationship between the charge pump circuit 600 and a clock signal generation circuit 710, as well as booster circuits 750 and 751. The clock signal generation circuit 710 generates the clock driving signals CLK1 320 and CLK2 330 for charge pump circuit 600, and is also depicted in FIG. 7B and discussed below. The first booster circuit 750 generates the signal CLK1A 662 that drives a threshold voltage cancellation pass gate driving capacitor 653 and is depicted in FIG. 7C and discussed below. FIG. 7C also depicts the second booster circuit 751 that generates the signal CLK2A 661. The second booster circuit 751 is also discussed below.

Couplings 571–573 generally allow their respective pass gate devices to open and close, so that the pass gate device allows charge to propagate in the preferred direction when a preceding stage transfers charge to a subsequent stage, while preventing charge from deleteriously flowing from a subsequent stage to a preceding stage. For example, when pump node 511 is charged and pump node 512 is discharged, coupling 571 couples the voltage at pump node 511 to the control terminal of pass gate device 542, causing pass gate device 542 to conduct, thereby transferring charge from pump node 511 to pump node 512. As the voltage on pump nodes 511 and 512 equalize, pass gate device 542 will shut off, so that charge will not flow from pump node 512 "backward" into pump node 511. Threshold voltage cancellation pass gate devices typically need approximately 1.0 volts at the control terminal to fully turn on.

According to an embodiment of the present invention, coupling a control terminal of a threshold voltage cancellation pass gate device to the preceding pump node is sufficient to control the pass gate in order to operate a charge pump. Unfortunately, for supply voltages of about 1.8 volts and less, control of a threshold voltage cancellation pass gate device in this manner may not be sufficient.

Referring once again to FIG. 4, it is to be appreciated that clock signal CLK1 320 and CLK2 330 comprise two segments in each cycle in which the clock signal is not actually being driven. During these times, a subsequent pump driving node, e.g., pump driving node 271, is being pre-charged, according to an embodiment of the present invention. During this pre-charging time, however, the previous pump node, e.g., pump driving node 270, is also being pulled down, to approximately one half of the clock signal voltage. The clock driving voltage is typically Vcc. Consequently, for Vcc, e.g., Vcc 510, less than about 1.8 volts, the resulting 0.9 volts (1.8/2) at the pump driving node, e.g., pump node 511, is typically not sufficient to cause the threshold voltage cancellation pass gate device, e.g., threshold voltage cancellation pass gate device 542, to open. As an unfortunate result, circuit 500 may not operate at desirable low supply voltages.

FIG. 6 illustrate a charge pump circuit 600 for operation at low supply voltages, for example 1.8 volts or below, according to an embodiment of the present invention.

Capacitors 652, 653, and 654 drive threshold voltage cancellation pass gates, and are referred to as threshold voltage pass gate driving capacitors. Threshold voltage pass gate driving capacitor 652 is driven by clock signal CLK2A 661. CLK2A 661 is a time-advanced version of CLK1 320. Threshold voltage pass gate driving capacitor 653 is driven by clock signal CLK1A 662. CLK1A 662 is a time-advanced version of CLK2 330. Clock signals CLK1A 662 and CLK2A 661 will be described in greater detail below.

As depicted in FIG. 4, signals CLK1 320 and CLK2 330 have a high state, a low state, and a high impedance state that allows pump driving nodes 270 and 271 to float. When the signals CLK1 320 and CLK2 330 are in the high impedance state, pump driving node pre-charge pass gates 310, 312, and 315 may be selectively closed to transfer charge from one pump driving node to pump driving node in a subsequent stage. In FIG. 6, a signal is coupled to pump driving node pre-charge pass gates 310, to selectively open the pass gate. When a pump driving node pre-charge pass gate (e.g., 310, 312, or 315) is closed, charge is allowed to transfer between pump driving nodes. When a pump driving node pre-charge pass gate (e.g., 310, 312, or 315) is opened, charge is not allowed to transfer between pump driving nodes.

In addition to having a time relationship with CLK1 320 and CLK2 330, clock signals CLK1A 662 and CLK2A 661 should also be driven at a voltage greater than about 2.0 volts, according to an embodiment of the present invention. When driven at a voltage greater than about 2.0 volts, clock signals CLK1A 662 and CLK2A 661 are beneficially able to turn on the associated threshold voltage cancellation pass gate devices, allowing charge to flow to a subsequent stage of charge pump circuit 600.

Advantageously, the combination of novel threshold voltage pass gate driving capacitors, e.g., capacitors 652 through 654, working with novel threshold voltage pass gate driving capacitor clock signals, e.g., CLK1A 662 and CLK2A 661, are complementary with coupling a pump driving node to a control gate of a threshold voltage pass gate device, e.g., via coupling 571. In this novel manner, threshold voltage pass gate driving capacitor clock signals are not required to provide all of the energy necessary to open a threshold voltage pass gate device, as some of the required energy is provided from the previous stage pump node.

Figure 7A:
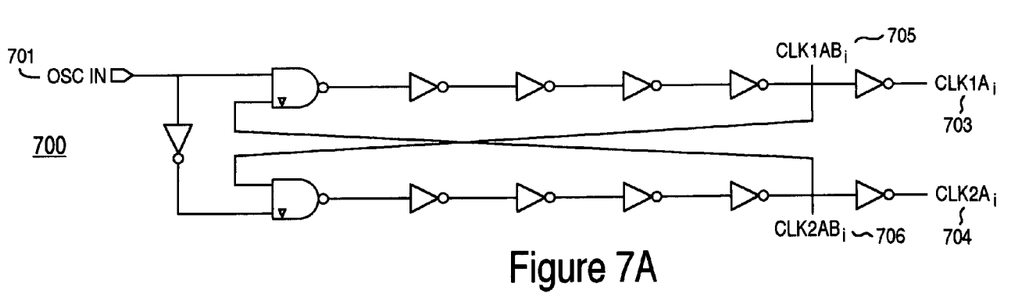
FIGS. 7A, 7B, and 7C illustrates threshold voltage pass gate driving capacitor clock signal generation circuitry, according to an embodiment of the present invention.
Figure 7B:
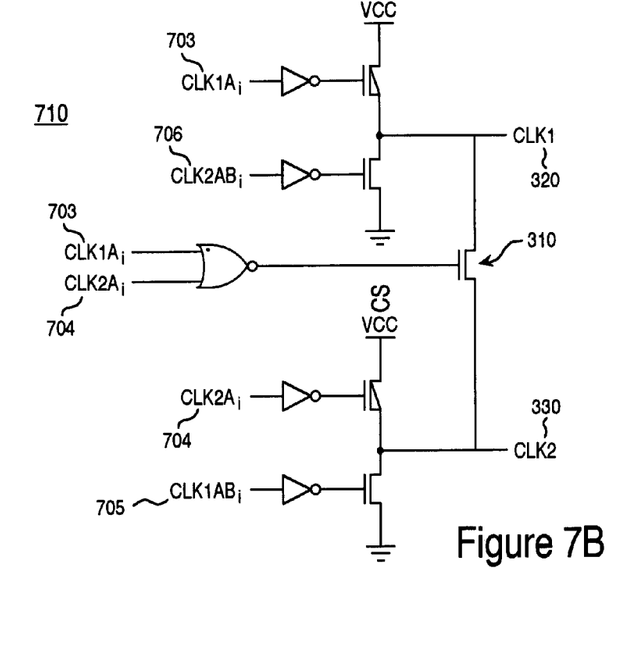
Figure 7C:
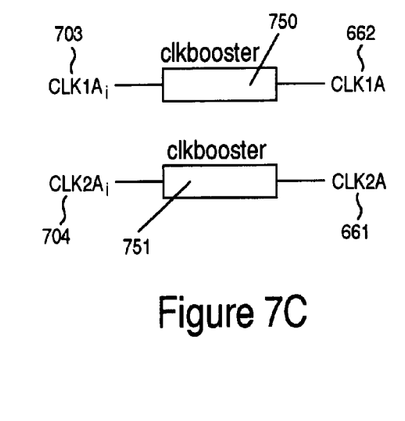

FIGS. 7A, 7B, and 7C illustrates threshold voltage pass gate driving capacitor clock signal generation circuitry, according to an embodiment of the present invention. In FIG. 7A, circuit 700 takes as an input a clock oscillator signal 701. Preferably, the duty cycle of signal 701 is approximately fifty percent, and the frequency is chosen so be compatible with other circuit elements, e.g., the charging time of capacity elements of charge pump circuit 600. It is to be appreciated that embodiments of the present invention are well suited to a wide range of oscillator signal 701 frequencies and duty cycles.

As depicted in FIG. 7A, circuit 700 produces non-overlapping clock signals CLK1Ai 703 and CLK2Ai 704. In addition, signal CLK1ABi 705, the inverse of CLK1Ai 703, and the signal CLK2ABi 706, the inverse of CLK2Ai 704, are generated.

Non-overlapping clock signals CLK1Ai 703 and CLK2Ai 704 along with their compliments serve as inputs to circuit 710 of FIG. 7B. Circuit 710 produces pump driving node signals CLK1 320 and CLK2 330. It is appreciated that both CLK1 320 and CLK2 330 comprise segments of their waveforms that are floating rather than driven, according to an embodiment of the present invention.

In order to produce threshold voltage pass gate driving capacitor clock signals CLK1A 662 and CLK2A 661, it may be necessary to boost their voltage to a level of greater than about 2.0 volts, according to an embodiment of the present invention. FIG. 7C shows clock boost circuits 750 and 751. Clock boost circuits 750 and 751 may boost clock signal CLK1Ai 703 and CLK2Ai 704 respectively to an appropriate voltage range. It is appreciated that embodiments of the present invention are well suited to a wide variety of means of boosting a clock signal voltage, for example using a single stage voltage booster.

The novel low power charge pump provides low power operation of devices requiring stepped up voltages, particularly flash memory devices. Experimental results have demonstrated an increase in single stage efficiency. A conventional four-stage charge pump was determined to have an energy efficiency of 87% per stage. A corresponding embodiment of the present invention was determined to have an energy efficiency of 95% per stage. It is appreciated that for a four-stage pump, the tested embodiment of the present invention is approximately 42% more efficient than the conventional design.

In addition, the tested embodiment of the present invention demonstrated a 50 nanosecond increase in start up time in comparison to the conventional design. Increased start up time is very beneficial in low power devices. Such devices are frequently set into a low function, low power mode in order to save energy. A power supply, for example a charge pump, with fast start up characteristics may enable increased transitions in and out of a low power mode, beneficially increasing the amount of time spent in the low power mode, and consequently advantageously reducing total power consumption. These beneficial results allow for improved energy-efficient performance of devices, rendering a competitive advantage to the users practicing embodiments of the present invention.

Embodiments of the present invention provide a means to increase the efficiency of charge pumps. Further embodiments of the present invention provide for increasing the efficiency of charge pumps in a manner that is compatible and complimentary with conventional approaches to implementing high efficiency charge pumps. Still further embodiments of the present invention provide for the above mentioned solutions to be achieved with existing semiconductor processes and equipment without revamping well established tools and techniques.

The preferred embodiment of the present invention, low power charge pump, is thus described. While the present invention has been described in particular embodiments, it should be appreciated that the present invention should not be construed as limited by such embodiments, but rather construed according to the below claims.

What is claimed is:

1. A charge pump electronic circuit for boosting a low input voltage, wherein inputs of said charge pump electronic circuit comprise a first driving signal and a second driving signal, wherein said first and second driving signals are outputs of a first clock signal generation circuit, wherein inputs of said first clock signal generation circuit are a third clock signal and a fourth clock signal, said charge pump electronic circuit for boosting comprising:

a first threshold voltage cancellation pass gate device coupled with a low input voltage source providing the low input voltage;

a first pump node coupled with said first threshold voltage cancellation pass gate device and a first capacitive element;

a first pump driving node coupled with said first capacitive element for receiving said first driving signal;

a second pump node coupled with a second capacitive element;

a second pump driving node coupled with said second capacitive element for receiving said second driving signal, wherein said second driving signal is 180 degrees out of phase with said first driving signal;

a pump driving node pre-charge pass gate device for selectively coupling said first pump driving node to said second pump driving node, wherein when said first and second driving signals are in concurrent high impedance states, said pump driving node pre-charge pass gate device transfers charge from said first pump driving node to said second pump driving node;

a second threshold voltage cancellation pass gate device for coupling said first pump node with said second pump node;

a coupling between said first pump node and said second threshold voltage cancellation pass gate device;

a fifth signal coupled with said second threshold voltage cancellation pass gate device for increasing voltage at said second threshold voltage cancellation pass gate device above a voltage of said first pump node, wherein said fifth signal is a boosted version of said third clock signal; and a sixth signal coupled with said first threshold voltage cancellation pass gate device for increasing voltage at said first threshold voltage cancellation pass gate device above a voltage of said low input voltage source, wherein said sixth signal is a boosted version of said fourth clock signal.

2. The charge pump electronic circuit as described in claim 1 wherein said low input voltage is equal to or less than about 1.8 volts.

3. The charge pump electronic circuit as described in claim 2 further comprising a third capacitive element for driving said second threshold voltage cancellation pass gate device, wherein said third capacitive element is coupled with said fifth signal, and a fourth capacitive element for driving said first threshold voltage cancellation pass gate device, wherein said fourth capacitive element is coupled with said sixth signal.

4. The charge pump electronic circuit as described in claim 3, wherein said third and fourth capacitive elements require a voltage of at least 2.0 volts to turn on said second and first threshold voltage cancellation pass gate, respectively, and wherein said fifth and sixth signals are boosted to a voltage equal to or greater than about 2.0 volts.

5. The charge pump electronic circuit as described in claim 1 rendered in an integrated circuit.

6. The charge pump electronic circuit as described in claim 5 wherein said integrated circuit comprises non-volatile memory.

7. The charge pump electronic circuit as described in claim 6 wherein said non-volatile memory comprises a floating gate storage element.

8. The charge pump electronic circuit as described in claim 6 wherein said non-volatile memory comprises a nitride layer as a storage element.

* * * * *